United States Patent
Pan et al.

(10) Patent No.: US 12,536,208 B2
(45) Date of Patent: Jan. 27, 2026

(54) COMPUTER-BASED INTERACTIVE PROMPT VARIATION GENERATOR

(71) Applicant: International Business Machines Corporation, Armonk, NY (US)

(72) Inventors: Qian Pan, Canton, MA (US); Hyo Jin Do, Cambridge, MA (US); Zahra Ashktorab, Brooklyn, NY (US); Michael Desmond, White Plains, NY (US); James Johnson, Somerville, MA (US); Casey Dugan, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 18/472,421

(22) Filed: Sep. 22, 2023

(65) Prior Publication Data

US 2025/0103621 A1 Mar. 27, 2025

(51) Int. Cl.
*G06F 16/332* (2025.01)
*G06F 16/3329* (2025.01)

(52) U.S. Cl.
CPC ...... *G06F 16/3323* (2019.01); *G06F 16/3328* (2019.01); *G06F 16/3329* (2019.01)

(58) Field of Classification Search
CPC ............. G06F 16/3323; G06F 16/3328; G06F 16/3329
USPC ......................................................... 707/767
See application file for complete search history.

(56) References Cited

U.S. PATENT DOCUMENTS

| 7,181,438 B1 * | 2/2007 | Szabo | G06Q 30/0269 705/14.27 |
| 7,546,235 B2 | 6/2009 | Brockett | |
| 7,849,096 B2 * | 12/2010 | Fein | G06F 16/2425 707/765 |

(Continued)

FOREIGN PATENT DOCUMENTS

| CN | 114299072 B | 6/2022 |
| RU | 2533441 C2 | 2/2014 |

OTHER PUBLICATIONS

"DALL-E 2," printed Jul. 27, 2023, 15 pages, https://openai.com/dall-e-2.

(Continued)

*Primary Examiner* — Giovanna B Colan
(74) *Attorney, Agent, or Firm* — Joseph P. Curcuru (57) ABSTRACT

In an approach to improve prompt variations to enhance user-based experiences while interacting with artificial intelligent (AI) systems, embodiments generate variations of the prompts associated with the initial input by automatically leveraging machine learning techniques and collect the prompts from a user resulting from an interaction with an artificial intelligent (AI) system. Further, embodiments, identify a heuristic to organize suggestions and the variations of the prompts, and determine and utilize the heuristic to organize the variations of the prompts in systematic categories to produce an efficient display of the variations of the prompts, in a graphic user interface (GUI), for the user to view. Additionally, embodiments, update the variations of the prompts based on identified interaction data from the user, and dynamically output the updated variations of the prompts in response to the identified and collected user data.

20 Claims, 5 Drawing Sheets

(56) References Cited

U.S. PATENT DOCUMENTS

| | | | |
|---|---|---|---|
| 8,571,358 | B2 | 10/2013 | Zhao |
| 8,768,070 | B2 | 7/2014 | Gelfand |
| 9,892,156 | B2 | 2/2018 | Gupta |
| 10,042,896 | B2 | 8/2018 | Sun |
| 10,075,384 | B2 * | 9/2018 | Shear .................. H04L 63/10 |
| 11,527,318 | B2 | 12/2022 | Theory |
| 11,836,170 | B1 * | 12/2023 | Tao .................. G06F 16/3329 |
| 2021/0157989 | A1 * | 5/2021 | Orr .................. G06F 40/216 |
| 2021/0200657 | A1 * | 7/2021 | Udipi .................. H04L 67/52 |
| 2023/0205824 | A1 * | 6/2023 | Jablokov .............. G06F 16/93 |
| | | | 707/737 |

OTHER PUBLICATIONS

"Midjourney Prompt Generator," https://huggingface.co/spaces/doevent/prompt-generator, printed Sep. 22, 2023, 1 page.

"Prompt IDE light," http://promptide.vizhub.ai/, printed Aug. 2, 2023, 1 page.

"Sentence Rewriter: Rewrite Sentences With Our AI Rewriter Tool," printed Jul. 24, 2023, 10 pages, https://www.copy.ai/tools/sentence-rewriter.

"Theory and Technology of a New Conversational AI System and Related Systems and Methods," IP.com Prior Art Database Technical Disclosure, IPCOM000271041D, Oct. 1, 2022, 72 pgs, Copyright © 2022 Glenn Hofford.

Ai prompt, https://www.aiprompt.io/, 2022, 8 pages.

Anonymous, "Method and System for Analyzing Performance of a User in a Virtual Reality (VR) Interaction to Modify the VR Interaction Medium," IP.com Prior Art Database Technical Disclosure, IPCOM000260469D, Nov. 26, 2019, 6 pgs.

Anonymous, "System for Guided Social Sentiment Lifecycle for Tasks/Events," IP.com Prior Art Database Technical Disclosure, IPCOM000251252D, Oct. 27, 2017, 5 pgs.

Anonymous, "Visual User Interface (UI) Interaction Prediction," IP.com Prior Art Database Technical Disclosure, IPCOM000257708D, Mar. 5, 2019, 12 pgs.

Cao et al., "Automated Query Reformulation for Efficient Search based on Query Logs From Stack Overflow," 2021 IEEE/ACM 43rd International Conference on Software Engineering (ICSE), 2021, pp. 1273-1285.

https://openai.com/, printed Jul. 24, 2023, 16 pages.

Iyer et al., "Introducing Fiddler Auditor: Evaluate the Robustness of LLMs and NLP Models," Fiddler AI Blog, May 23, 2013, 5 pages. https://www.fiddler.ai/blog/introducing-fiddler-auditor-evaluate-the-robustness-of-llms-and-nlp-models.

Jiang et al., "How Can We Know What Language Models Know?" arXiv:1911.12543v2, May 3, 2020, 15 pages.

Lexica, printed Jul. 24, 2023, 3 pages, https://lexica.art/.

Liu et al., "Late Prompt Tuning: A Late Prompt Could be Better Than Many Prompts," arXiv:2210.11292v2, Oct. 21, 2022, 14 pages.

Mathews et al., "SemStyle: Learning to Generate Stylised Image Captions Using Unaligned Text," CVPR paper, 2018, pp. 8591-8600.

Pavlichenko et al., "Best Prompts for Text-to-Image Models and How to Find Them," arXiv:2209.11711v3, Jun. 1, 2023, 13 pages.

SEO Tool Centre, printed Jul. 24, 2023, 6 pages, https://seotoolscentre.com.

Shin et al., "Autoprompt: Eliciting Knowledge from Language Models with Automatically Generated Prompts," arXiv:2010.15980v2, Nov. 7, 2020, 15 pages.

Stable Boost, https://stableboost.ai/, printed Aug. 2, 2023, 10 pgs.

Strobelt et al., "Interactive and Visual Prompt Engineering for Ad-hoc Task Adaptation with Large Language Models," arXiv:2208.07852v1, Aug. 16, 2022, 11 pages.

Typestitch, printed Aug. 2, 2023, 1 page, https://typestitch.com/.

Vinyals et al., "Show and Tell: A Neural Image Caption Generator," CVPR2015 paper, 2015, pp. 3156-3164.

Wu et al., "IDPG: An Instance-Dependent Prompt Generation Method," arXiv:2204.04497v1, Apr. 9, 2022, 15 pages.

Yang et al., Measuring and Improving User Experience Through Artificial Intelligence-Aided Design, Frontiers in Psychology, vol. 11, Article 595374, Nov. 2020, pp. 1-11.

Zhao et al., "Interaction Design System for Artificial Intelligence User Interfaces Based on UML Extension Mechanisms," Mobile Information Systems, vol. 2022, Article 3534167, 8 pages.

* cited by examiner

PROPOSED GUI EXAMPLE 1

INITIAL INPUT: ~202

| DRAW A HUMAN AVATAR | SUBMIT |

TOP K RESULTS ~204

LOAD MORE

PROMPT REPHRASING ALTERNATIVES ~206

$207_1$ $207_2$ $207_3$ $207_4$ $207_5$ $207_6$

| ELABORATION | SIMPLIFY | SENTENCE RESTRUCTURING | SYNONYM SUBSTITUTION | CONTEXTUAL REPHRASING | PARAPHRASING |

1. PROMPT VARIATION SUGGESTION ~$208_1$

2. PROMPT VARIATION SUGGESTION ~$208_2$

LOAD MORE

FIG. 3

PROPOSED GUI EXAMPLE 2

INITIAL INPUT: ~202

OUTCOME REVIEW ~210

PROMPT REPHRASING ALTERNATIVES ~206

| $207_1$ | $207_2$ | $207_3$ | $207_4$ | $207_5$ | $207_6$ |
|---|---|---|---|---|---|
| ELABORATION | SIMPLIFY | SENTENCE RESTRUCTURING | SYNONYM SUBSTITUTION | CONTEXTUAL REPHRASING | PARAPHRASING |

1. PROMPT VARIATION SUGGESTION ~$208_1$

2. PROMPT VARIATION SUGGESTION ~$208_2$

COMPUTER-BASED INTERACTIVE PROMPT VARIATION GENERATOR

BACKGROUND OF THE INVENTION

The present invention relates generally to artificial intelligence systems, and more particularly to the field of user interaction and use of artificial intelligence systems.

An artificial intelligent (AI) prompt generator is a tool that uses natural language processing and machine learning algorithms to generate prompts for AI tools. A prompt is simply a starting point or an idea that helps kickstart your project. It can be a word, a phrase, or a question that inspires you to create something unique with the help of artificial intelligence. The AI prompt generator can create prompts based on different criteria, such as type of the project, genre, tone, style, length, or even specific keywords or concepts. For example, if you're working on a business project and need to generate some marketing copy, you could input your target audience, product features, and desired tone into the AI prompt generator.

Prompt engineering or prompting is the process of structuring sentences so that they can be interpreted and understood by a generative AI model in such a way that its output is in accord with the user's intentions. A prompt can be a description of a desired output such as a high-quality photo of an astronaut riding a horse or a command such as write a limerick about chickens. The ability to understand prompts is an emergent ability of large language models. Prompt engineering for a text-to-text models may involve phrasing a query, providing relevant context, refining, or adjusting prompts, and asking follow-up questions. For a text-to-image model it may involve adding, removing, emphasizing, and re-ordering words to achieve a desired subject, style, aesthetic, layout, lighting, and texture.

SUMMARY

Embodiments of the present invention disclose a computer-implemented method, computer system, and computer program product for improving prompt variations to enhance user-based experiences while interacting with artificial intelligent (AI) systems, the computer-implemented method comprising: outputting prompts based on an initial input; generating variations of the prompts associated with the initial input by automatically leveraging machine learning techniques; collecting the prompts from a user resulting from an interaction with an AI system; identifying a heuristic to organize suggestions and the variations of the prompts; determining and utilizing the heuristic to organize the variations of the prompts in systematic categories to produce an efficient display of the variations of the prompts, in a graphic user interface (GUI), for the user to view; updating the variations of the prompts based on identified interaction data from the user; and dynamically outputting the updated variations of the prompts in response to the identified and collected user data.

DETAILED DESCRIPTION

Embodiments of the present invention recognize that the current manual approach to reformatting prompts is slow, error-prone, and lacks standardization, resulting in suboptimal outcomes, reduced productivity, and negative user experience. Thus, embodiments of the present invention recognize that a more efficient and standardized solution is needed to streamline the process, reduce errors, and improve the quality of the outcome. Embodiments of the present invention recognize that typical graphic user interfaces (GUI), in the art, require an extensive manual effort to develop prompt variations and review their generated results.

Embodiments of the present invention recognize that in prior works a set of prompt variations are generated via different machine learning techniques (e.g., adding keywords, paraphrasing, etc.). However, embodiments of the present invention recognize that, in previous works and techniques in the art did not include or propose any method to determine the proper heuristic (heuristic) to organize prompt variation suggestions in systematic categories to enable user to effectively review the generated output. Embodiments of the present invention solve this issue by automatically updating the heuristic based on data from interactions of a user, which results in changes of order/categories of prompt variations to support more effective review process. Data from interactions of a user comprise: navigation path, user preferences, iteration intent text input, and/or any other user interaction data known and understood in the art.

A heuristic is delineated by a collection of evaluation criteria accompanied by scoring mechanisms. The evaluation criteria and respective weights are first established in accordance with the user's specific use case, encompassing both input and output data considerations. Heuristic may refer to a systematic approach that aids in the automatic evaluation of outcomes, guided by user-defined criteria and preferences. The evaluation criteria and respective weights may be predetermined.

Further, embodiments of the present invention solve, at least, the issues presented above and improve the art by leveraging various machine-learning techniques to automatically generate a set of prompt variations based on the user's initial input, organize and sort suggestions in systematic categories to enable users to effectively review, and automatically update the prompt variations based on interaction data of the user. Embodiments of the present invention solve, at least, the issues presented above and improve the art by leveraging different machine-learning techniques to automatically generate variations of prompts to enable users complete a task more efficiently by (i) collecting user's prompts, resulting from human-AI interaction, including but not limited to web interfaces, chatbots, (ii) automatically leveraging machine learning techniques to generate the variation of a given text input comprising: synonym substitution, sentence restructuring, paraphrasing, summarization: Reducing the length of the text by extracting its key points and condensing them into a shorter form, contextual rephrasing, (iii) utilizing a storage system with methods to record and retrieve users' iteration feedback in a central data base, (iv) determining the proper heuristic (heuristic) to organize suggestions in systematic categories to enable user to effectively review generated output, (v) automatically updating the prompt variations based on user's interaction data.

A "proper heuristic" (i.e., heuristic) refers to a heuristic that effectively captures and aligns with user features, wherein the user features comprise (i) user's use case, which entails a heuristic that closely mirrors the user's specific use case, wherein this heuristic can be generated by the system (e.g., whether it involves transforming text into images or other textual content, and it should also take into account the user's initial input data), (ii) user interaction data, which pertains to a heuristic that factors in the user's interactions with the system, which takes into consideration the data collected from these interactions to further enhance its ability to evaluate and provide relevant outcomes. User interaction data may comprise, but not limited to, (i) iteration intent, (ii) navigation data, (iii) previous interaction data, (iv) preference data, and (v) task types of data. In various embodiments, a heuristic considers the user's intent to iterate or refine their process. It adapts to the user's desire for iterative improvements in the outcomes and helps guide these refinements effectively. Navigation data is a method that enables users to navigate the prompt variation space by selecting variations, resulting in the automatic modification of their previous prompts. Previous interaction data may comprise utilizing the suggested prompts or prompt categories to iterate their input based on previous interaction data. In various embodiments, prompt variations will be automatically regenerated based on user's preference data. In various embodiments, variation categories can be ranked according to the user's task types.

Implementation of embodiments of the invention may take a variety of forms, and exemplary implementation details are discussed subsequently with reference to the Figures (i.e., FIG. 1-FIG. 5).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
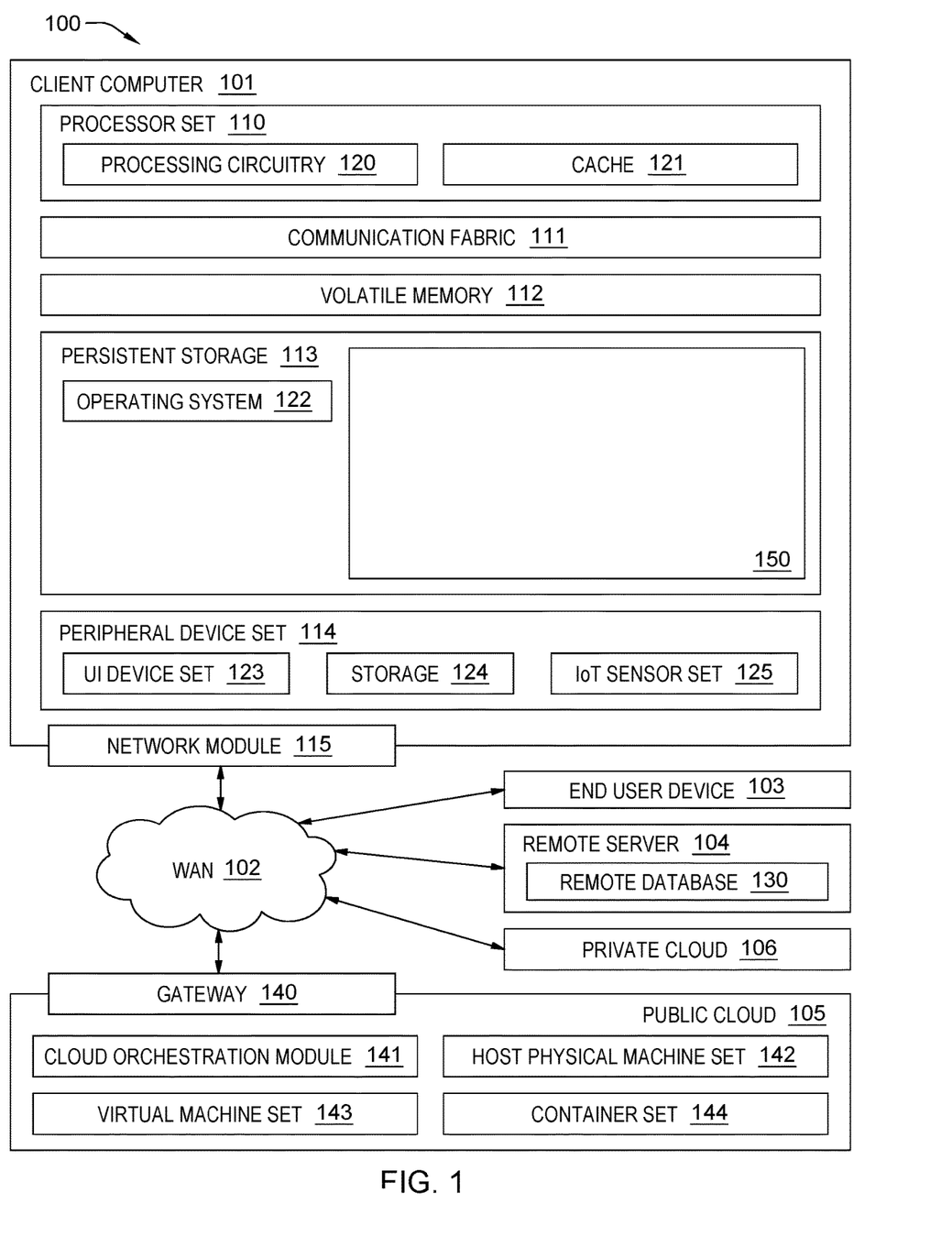
FIG. 1 is a functional block diagram illustrating a distributed data processing environment, a program, in accordance with an embodiment of the present invention.

Computing environment 100 contains an example of an environment for the execution of at least some of the computer code involved in performing the inventive methods, such as program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, a virtual reality headset, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 may automatically update the heuristic of an AI system based on data from user interactions, which results in changes of order and categories of prompt variations to support more effective review process, wherein data from interactions of a user comprise: navigation path, user preferences, iteration intent text input, and/or any other user interaction data known and understood in the art. Component 150 enables and utilizes user to interact to generate the most effective prompts to achieve a desired outcome, including, but not limited to, text, images, and audio prompt requests.

The "most effective prompt" is one that optimizes a language model's response in terms of productivity and relevance. This prompt efficiently obtains the desired information or output. Effectiveness considers both alignment with user preference and prompt generation speed. Our proposed invention's Component 150 not only auto-generates prompt variations but also categorizes suggestions systematically, allowing users to get inspired and review prompt variations more effectively.

For instance, when generating a summary about climate change from a research paper, a less effective prompt is vague: "Summarize the paper on climate change." A more effective prompt, such as: "Provide a concise summary of the research paper 'Impact of Rising Temperatures on Coastal Ecosystems,' focusing on the effects on marine biodiversity and local economies," guides the model with context, specifics, and relevance. Without our invention, users might not know which details/context should be added or modified, potentially spending a significant amount of time devising prompt variations. However, our invention automates this process, offering prompt variations as inspiration based on user intent and interaction data, thereby delivering desired outcomes with minimal manual effort.

Component 150 may leverage various machine-learning techniques to automatically generate a set of prompt variations based on the user's initial input, organize and sort suggestions in systematic categories to enable users to effectively review, and automatically update the prompt variations based on interaction data of the user. In various embodiments, component 150 leverages different machine-learning techniques to automatically generate variations of prompts to enable users complete a task more efficiently by (i) collecting user's prompts, resulting from human-AI interaction, including but not limited to web interfaces, chatbots, (ii) automatically leveraging machine learning techniques to generate the variation of a given text input comprising: synonym substitution, sentence restructuring, paraphrasing, summarization: Reducing the length of the text by extracting its key points and condensing them into a shorter form, contextual rephrasing, (iii) utilizing a storage system with methods to record and retrieve users iteration feedback in a central data base, (iv) determining the proper heuristic (heuristic) to organize suggestions in systematic categories to enable user to effectively review generated output, (v) automatically updating the prompt variations based on user's interaction data.

In various embodiments, a heuristic is identified to align with user features, such as user's use case, iteration intent put, and interaction data. In various embodiments, component 150 generates a heuristic to efficiently categorize and organize the prompt variations, wherein the categorized and organized prompt variations are displayed to a user, in an efficient manner, for review. For example: a user interacting with an AI to generate desired graphic for their website landing page. The goal is to generate a heuristic to enable the user to locate a desired iteration direction and iterate their prompt more effectively to get produced the desired graphic.

Regarding user use case, component 150 considers the current style of the landing page as context info to determine the graphic style. The heuristic mirrors determined graphic style to align with the user's graphic style preferences. In various embodiments, interaction data informs the heuristic. In various embodiments, component 150 utilizes user iteration intent, navigation path, click, reaction for certain prompt variation to prioritize output options (e.g., prompt rephrasing alternatives 206).

In various embodiments, when determining how component 150 determines the heuristic, component weighs specific criteria generated from user case and user input (e.g., style and content requirements). Further, component 150, via the heuristic, evaluates the initial generated image alignment based on criteria and weights. The initially generated prompts are evaluated against iteration intent to update the wight of each criterion. The heuristic may evolve using interaction data, wherein component 150 utilizes the heuristic evolution to improve prompt variation recommendations. In various embodiments, the heuristic guides the component 150 in evaluating and suggesting prompt variations and outcomes that align with user preferences.

Component 150 may employ a variety of machine learning techniques to systematically generate prompt variations with efficacy. These techniques include but are not limited to rule-based transformations, natural language processing (NLP), transformer models, and reinforcement learning. Rule-Based Transformations involves applying predefined rules to systematically modify prompts. For instance, synonyms can replace words (e.g., synonym substitution), sentences can be rephrased (e.g., paraphrasing), or prompt structures can be altered while preserving intent (e.g., summarization). For example, transforming "Summarize the article on climate change" to "Provide a summary of the climate change article." NLP techniques may discern the semantics and syntax of prompts, generating variations that uphold context while introducing diversity. For instance, paraphrasing preserves meaning, like augmenting or automatically changing the input from "Explain the impact of climate change" to "Elaborate on the consequences of global warming."

Transformer Models comprises producing coherent and contextually fitting prompt variations are produced (e.g., contextual rephrasing) through generative model(s). Transformer models may possess a robust linguistic understanding, yielding variations aligned with user intent. For instance, inputting "Summarize the healthcare report" could yield variations such as "Give an overview of the medical report" or "Provide a concise summary of the health report." Reinforcement learning comprises learning from user feedback to enhance the quality of prompt variations over time. If specific variations are favored by users, then component 150 adapts to produce similar variations to the favored variations in subsequent interactions.

Figure 2:
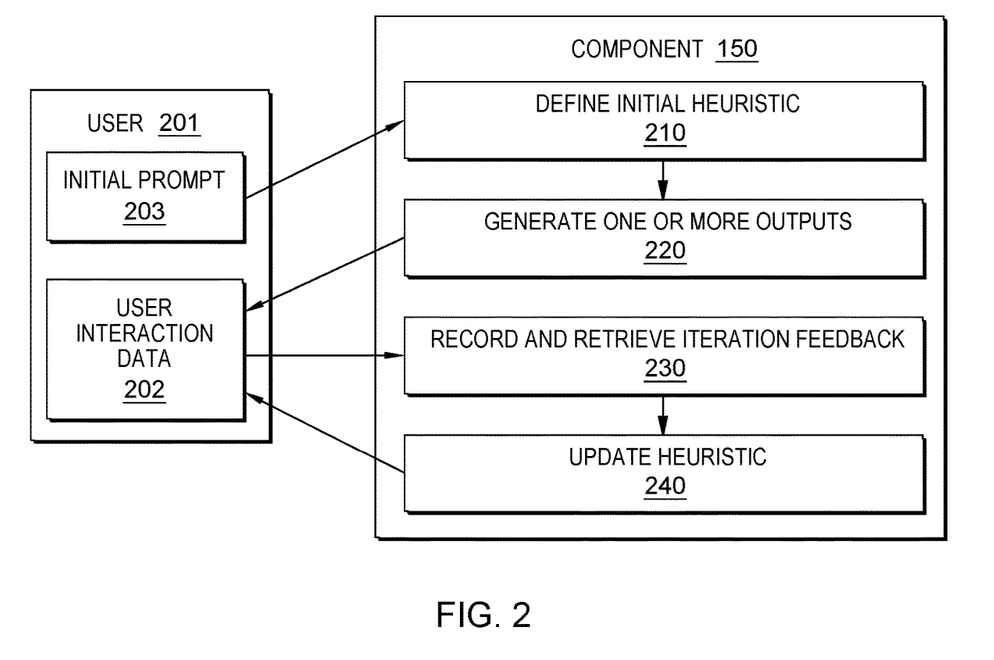
FIG. 2 illustrates a functional block diagram and operational steps of the program, on a server computer within the distributed data processing environment of FIGS. 1, in accordance with an embodiment of the present invention.

FIG. 2 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes predetermined area 159, client computer 101, and remote server 104 interconnected via WAN 102.

In various embodiments, component 150 collects initial prompt 203 and/or iteration intent input 202 from user 201, wherein the collecting of initial prompt 203 and/or iteration intent input 202 from user 201 results from interactions with an AI system and/or large language model (LLM) (e.g., chatbots) by user 201. In the depicted embodiment, via a user interface (e.g., GUI), component 150 receives initial prompt 203 and iteration intent input 202 from user 201. In various embodiments, responsive to receiving initial prompt 203, component 150 automatically generates a set of prompt variations based on initial prompt 203. Component 150 may automatically leverage and execute machine learning techniques to generate prompt variations of received text input (e.g., initial prompt 203 and/or iteration intent input 202). In the depicted embodiment, responsive to receiving initial prompt 203, component 150 defines initial heuristic 210 based on a use case of the user and initial prompt 203.

Further, in the depicted embodiment, component 150 generates one or more outputs 220 based on initial prompt 203 and defined initial heuristic 210 and generates a set of prompt variations associated with initial prompt 203. Component 150 may organize the set of prompt variations in systematic categories and displays the set of prompt variations and one or more outputs to user 201, via a predetermined GUI. In the depicted embodiment, component 150 collects user interaction data 202 from user 201 as the user interacts with the displayed set of prompt variations and one or more outputs to user 201. In the depicted embodiment, component 150 records and retrieves iteration feedback 230 from interactions from user 201 (i.e., user interactions). Component 150 updates the heuristic 240 to reorganize suggestions (e.g., prompt variations) in the systematic categories to facilitate an efficient output associated with initial prompt 203.

Machine learning techniques leveraged to generate prompt variations comprise, but are not limited to, synonym substitution, sentence restructuring, paraphrasing, summarization, and contextual rephrasing. Synonym substitution refers to replacing words in the text with their synonyms to change the wording without changing the meaning. Sentence restructuring refers to changing the order or structure of sentences in the text to create a new phrasing. Paraphrasing refers to expressing the same meaning as the original text using different words, phrases, and sentence structures. Summarization refers to reducing the length of the text by extracting its key points and condensing them into a shorter form. Contextual rephrasing refers to adapting the text to a specific context, audience, or purpose by adjusting the wording and meaning. Iteration intents (iteration intent input 202) are explicitly collected from user input or implicitly generated from the user's interactions.

Component 150 may utilize a data storage system to record and retrieve users' iteration feedback to and from a central database. In various embodiments, component 150 outputs one or more responses (i.e., generated suggestions) based on initial prompt 203, iteration intent input 202, and the executed machine learning techniques. In various embodiment, component 150 determines and utilizes a heuristic to organize the prompt variations in systematic categories to enable user 201 efficiently interact and review the generated output. Output refers to the generated outcome from component 150 based on a given prompt, wherein component 150 may generate a distinct output for each prompt variation (e.g., prompt rephrasing alternatives 206). For example, in the scenario where a user interacting with an AI to generate desired graphic for their website landing page, the output is a graphic for the landing page. Component 150 may automatically update the prompt variations based on the interaction data from user 201. User interactions may encompass actions such as "liking," "disliking," or "editing," among others user interactions with an AI system and/or computing device. Component 150 may utilize the collected data to update the heuristics, leading to the generation of diverse prompt variation directions. Consequently, categories will be updated, and the order of specific prompt variations within each category will be rearranged. An example of the detailed steps above are described in FIG. 3 below.

Figure 3:
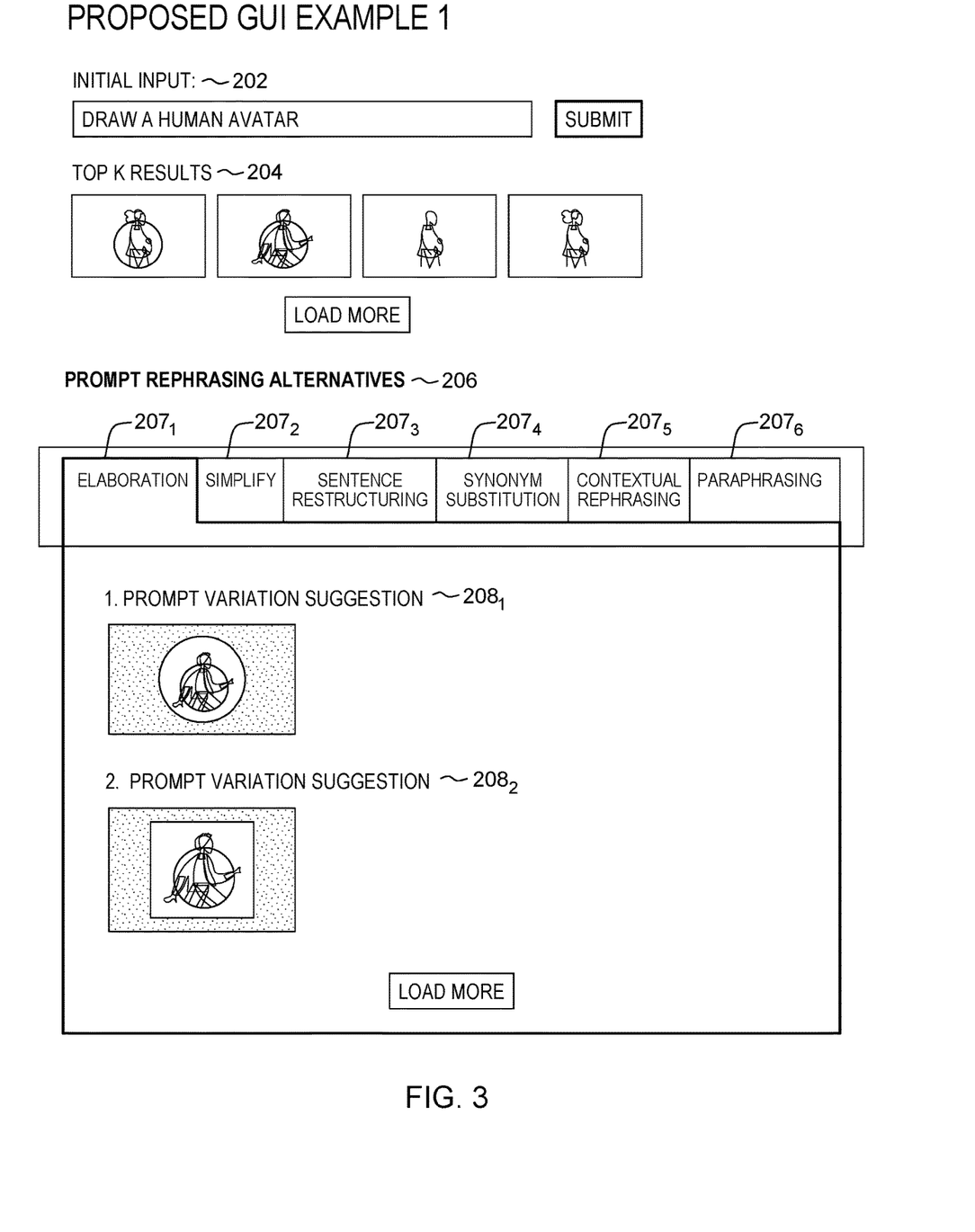
FIG. 3 illustrates a functional block diagram and operational steps of the program, on a server computer within the distributed data processing environment of FIGS. 1, in accordance with an embodiment of the present invention.

FIG. 3 is an example of component 150 operating and interacting with a user through a GUI accordance with one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

In this example, represented by FIG. 3, initial input 202, received from a user, requests that component 150 draw a human avatar, in which component 150 outputs Top K results 204. Top K results 204 are results returned by a retrieval algorithm that returns the "best: answers of a query according to a given ranking (K). Additionally, in this example, component 150 generates and outputs prompt rephrasing alternatives 206, wherein prompt rephrasing alternatives 206 comprise elaboration $207_1$, simplify $207_2$, sentence restructuring $207_3$, synonym substitution $207_4$, contextual rephrasing $207_5$, and paraphrasing $207_6$. In various embodiments, prompt variation suggestions are output based on prompt rephrasing alternatives 206, wherein component 150 generates and outputs prompt variation suggestions for each category of prompt rephrasing alternatives 206. In the depicted embodiment, responsive to elaboration $207_1$ being selected, component 150 generates and outputs to the user, via a user interface, prompt variation suggestion $208_1$ and prompt variation suggestion $208_2$. Continuing the example above, responsive to receiving a request to draw a human avatar as initial input 202 and the user selecting elaboration $207_1$, component 150 generates and outputs "draw a human avatar in an icon size" and "draw a human avatar in a square with size 15×15 (as prompt variation suggestion $208_1$ and prompt variation suggestion $208_2$ respectively).

In this specific example, supplementary information such as "in a square with dimensions of 15×15" is generated using the following approaches: the transfer model, traditional NLP techniques, and/or rule-based machine learning techniques. For example, the transfer model, as it operates as a contextual information system generated according to the user's specific use case (in this instance, a landing page). Regarding traditional natural language process techniques, as this information could be suggested based on data stored in the database. Rule-based machine learning techniques. In various embodiments, the supplementary information is utilized to create prompt variations, derived from user interaction data, where the user appears to favor more detailed outcomes.

In various embodiments, component 150 may generate and output prompt variation suggestions $208_1$-$208_N$, wherein N is any positive integer. In various embodiments, component 150 organizes (e.g., categorizes) prompt variation suggestions $207_1$-$207_6$ into systematic categories. Component 150 may automatically update prompt variation suggestions $207_1$-$207_6$ based on user interaction data. In some embodiments, initial input may be received from a database, an AI system, and/or any other computer system or program known and used in the art.

Figure 4:
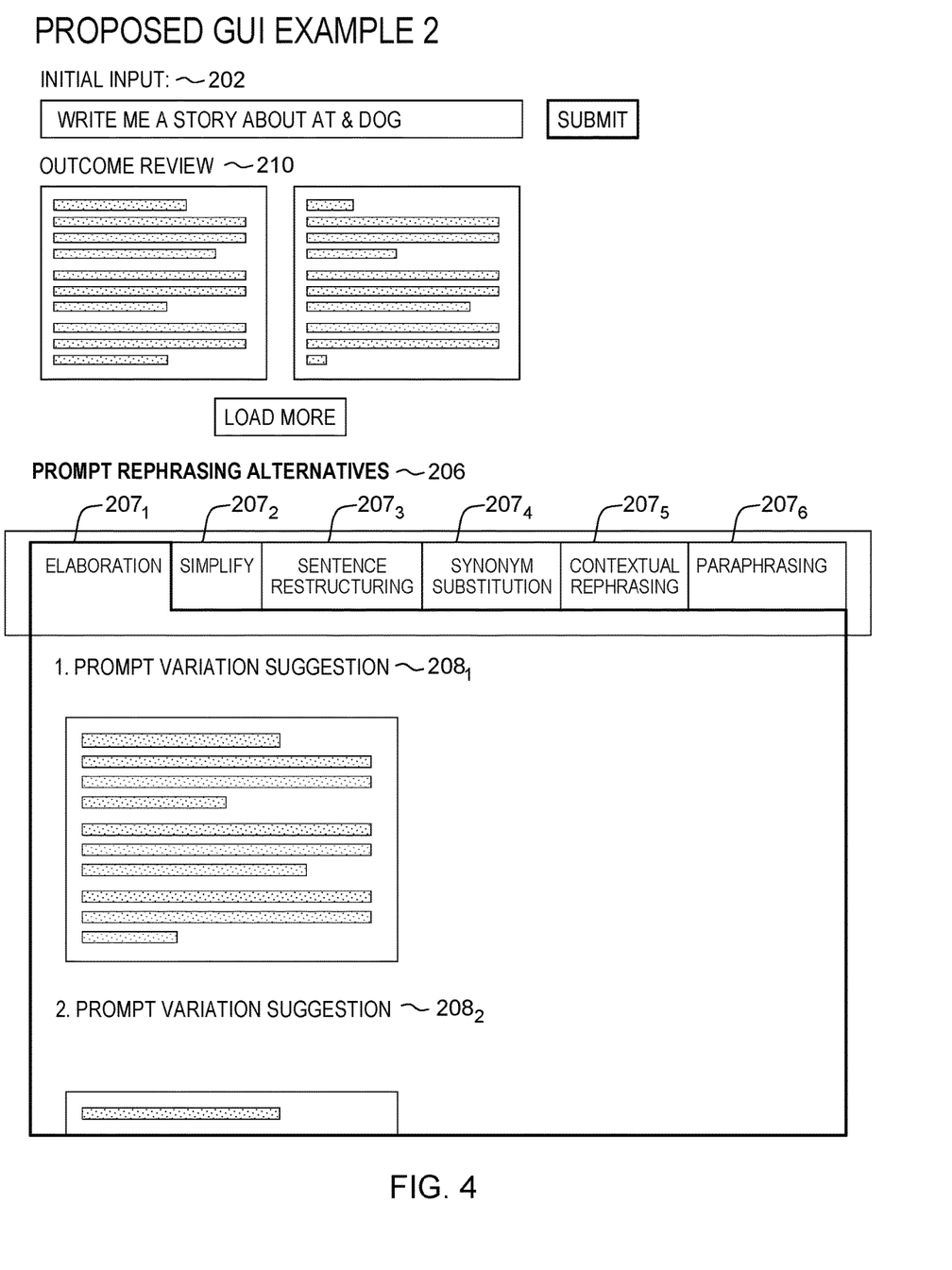
FIG. 4 illustrates one example, in accordance with an embodiment of the present invention.

FIG. 4 is an example of component 150 operating and interacting with a user through a GUI accordance with one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Generally, FIG. 4 provides another example of a GUI in relation to component 150. In this example, initial input 202, received from a user, requests that component 150 "write me a story about a cat and a dog," in which component 150 outputs outcome review 210. Additionally, in this example, component 150 generates and outputs prompt rephrasing alternatives 206, wherein prompt rephrasing alternatives 206 comprise elaboration $207_1$, simplify $207_2$, sentence restructuring $207_3$, synonym substitution $207_4$, contextual rephrasing $207_5$, and paraphrasing $207_6$.

Continuing the example, responsive to receiving a request to "write me a story about a cat and a dog" as initial input 202 and the user selecting elaboration $207_1$, component 150 generates and outputs "write me a story about a friendly but very greedy cat and a dog who becomes her unlikely companion" and "write me a story about a very friendly but greedy cat and a dog. The cat's insatiable appetite always gets her into trouble and the dog is her loyal friend who is always there to help her out" (representing prompt variation suggestion $208_1$ and prompt variation suggestion $208_2$ respectively) as suggestion to the user to elaborate on initial input 202. In various embodiments, responsive to a user selecting or implementing prompt variation suggestions $208_1$-$208_N$, component 150 executes an action to carry out the input based on the selection or implementation of the user. In some embodiments, component 150 monitors the keystrokes and cursor movement and/or user interaction to identify user action, wherein component 150 utilizes the user interaction (e.g., action) to update and regenerate and output prompt variation suggestions $208_1$-$208_N$, prompt rephrasing alternative 206, and query results. In various embodiments, component 150 may suggest "autofill" text to the user in the input entry portion of the GUI, wherein the autofill text is generated in relation to the selected category and/or section of prompt rephrasing alternatives 206.

In various embodiments, component 150 automatically updates the prompt variations based on user's interaction data, including but not limited to, navigation data, iteration intent, previous interaction data, preference data, and task types of data. Navigation Data is a method that enables users to navigate the prompt variation space by selecting variations, resulting in the automatic modification of their previous prompts. Iteration intent is a method that allows users to express their intention to iterate using textual data, among other possibilities. Previous interaction data refers to utilizing the suggested prompts or prompt categories to iterate their input based on previous interaction data. Preference data is prompt variations will be automatically regenerated based on user's preference data, such as preferences, interests, and dislikes. Task types of data is variation categories that can be ranked according to the user's task types. In various embodiments, component 150 generates and outputs an iterated prompt based on initial input 202, wherein the GUI comprises an iterated prompt window. In other embodiments, the iterated prompt is auto generated over initial input 202. In various embodiments, component 150 receives an iteration intent in addition to initial input 202, wherein the GUI comprises an input for the user to enter the iteration intent.

Figure 5:
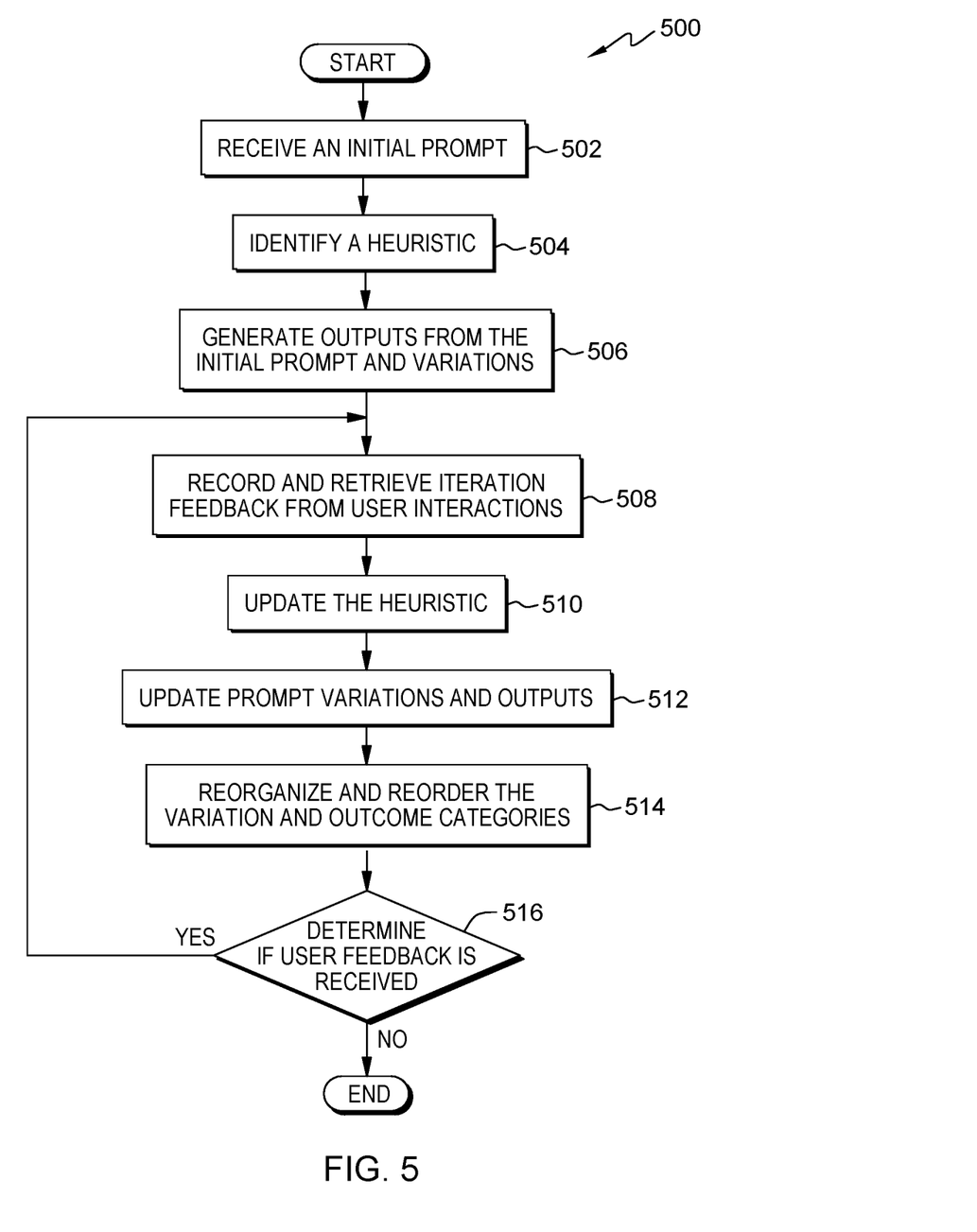
FIG. 5 illustrates operational steps of the program, on a server computer within the distributed data processing environment of FIGS. 1, for leveraging different machine-learning techniques to automatically generate variations to prompts associated with an input, in accordance with an embodiment of the present invention.

FIG. 5 illustrates operational steps of component 150, generally designated 200, in communication with client computer 101, remote server 104, private cloud 106, EUD 103, and/or public cloud 105, within distributed data processing environment 100, for leveraging different machine-learning techniques to automatically generate variations to prompts associated with an input, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In step 502, component 150 receives an initial input from a user. In various embodiments, component 150 receives one or more initial inputs from a user. Component 150 may collect the one or more initial inputs (i.e., user prompts) in real-time as the user interacts with the AI system. In various embodiments, component 150 outputs results based on the received initial input. In various embodiments component 150 displays the generated, retrieved, and/or formulated results, associated with the initial input.

In step 504, component 150 identifies a heuristic. In various embodiments, responsive to receiving the initial prompt, component 150 defines an initial heuristic based on a use case of the user and the initial prompt. In various embodiments, component 150 identifies a heuristic to organize suggestions and prompt variations. In various embodiments, component 150 determines and utilizes the heuristic to organize the generated prompt suggestions (suggestions) in systematic categories to produce an efficient display of the prompt variations for the user to efficiently interact and review the generated output (prompt variations).

In step 506, component 150 generates outputs based on the initial prompt and identified prompt variations. In various embodiments, component 150 generates and outputs prompt variations associated with the initial input from the user. In various embodiments. component 150 generates prompt variations of the initial input (user prompts) by leveraging machine learning techniques. Machine learning techniques leveraged to generate prompt variations comprise, but are not limited to, synonym substitution, sentence restructuring, paraphrasing, summarization, and contextual rephrasing. Synonym substitution refers to replacing words in the text with their synonyms to change the wording without changing the meaning. Sentence restructuring refers to changing the order or structure of sentences in the text to create a new phrasing. Paraphrasing refers to expressing the same meaning as the original text using different words, phrases, and sentence structures. Summarization refers to reducing the length of the text by extracting its key points and condensing them into a shorter form. Contextual rephrasing refers to adapting the text to a specific context, audience, or purpose by adjusting the wording and meaning.

In step 508, component 150 records and retrieves iteration feedback from a user. In various embodiments, component 150 retrieves and records iteration feedback associated with user interaction with the GUI and/or AI system. In various embodiments, component 150 records and retrieves user feedback from a central database. Component 150 may collect the iteration feedback and utilizes the iteration feedback to update the heuristic to generate and organize the prompt variations.

In step 510, updates the heuristic based on the iteration feedback from the user. Component 150 updates the heuristic to reorganize suggestions (e.g., prompt variations) in the systematic categories to facilitate an efficient output associated with initial prompt. The heuristic may evolve using interaction data, wherein component 150 utilizes the heuristic evolution to improve prompt variation recommendations. In various embodiments, the heuristic guides the component 150 in evaluating and suggesting prompt variations and outcomes that align with user preferences. Component 150 may utilize the collected data to update the heuristics, leading to the generation of diverse prompt variation directions. Consequently, categories will be updated, and the order of specific prompt variations within each category will be rearranged.

In step 512, component 150 updates prompt variations and outputs based on user interaction data. In various embodiments, component 150 may automatically update initial prompt variations and outputs based on identified interaction data from the user. In some embodiments, component 150 monitors the keystrokes and cursor movement and/or action to identify user action, wherein component 150 utilizes the user action to update and regenerate and output prompt variation suggestions prompt rephrasing alternatives, and query results. In various embodiments, component 150 may suggest "autofill" text to the user in the input entry portion of the GUI, wherein the autofill text is generated in relation to the selected category and/or section of the prompt rephrasing alternatives. In various embodiments, component 150 outputs prompt variations. In various embodiments, component 150 monitors user activity and dynamically outputs updated prompt variations in response to identified and/or collected user data.

In step 514, component 150 reorganizes the reorders the variation and outcome categories based on the updated heuristic. In various embodiments, component 150 utilizes the updated heuristic to reorganize suggestions (e.g., prompt variations) in the systematic categories (e.g., outcome categories) to facilitate an efficient output associated with the initial prompt and to facilitate efficient delivery of the output data presented in the GUI.

In step 516, component 150 determines if user feedback is received. In various embodiments, component 150 determines if user feedback associated with the updated prompt variations and outputs is received (e.g., a user selecting a prompt from the updated prompt variations, changing the prompt, selecting an output, etc.). In the depicted embodiment, responsive to determining that user feedback was received (Yes block), component 150 proceeds to block 508. In the depicted embodiment, responsive to determining that user feedback is not received (No block), component 150 ends. In various embodiments, component 150 executes block 508-516 until a final selection of the outputs is made by the user or the program is closed or times out.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
outputting prompts based on an initial input;
generating variations of the prompts associated with the initial input by automatically leveraging machine learning techniques, wherein automatically leveraging machine learning techniques comprises reducing a length of text of the initial input by extracting one or more key points and condensing the text of the initial input into a shorter form;
collecting the prompts from a user resulting from an interaction with an artificial intelligent (AI) system;

defining a heuristic based on a use case of the user, interaction data, and the initial input to organize suggestions and the variations of the prompts;
utilizing the heuristic to organize the variations of the prompts in systematic categories to produce an efficient display of the variations of the prompts, in a graphic user interface (GUI), for the user to view, wherein the heuristic mirrors a determined style preference of the user, and wherein the user interaction date is utilized to prioritize output options, and wherein the user interaction data comprises user interactions with the GUI associated with the initial input and the variations of the prompts;
updating the variations of the prompts based on identified interaction data from the user; and
dynamically outputting the updated variations of the prompts in response to the identified and one or more collected user data.

2. The computer-implemented method of claim 1, wherein the machine learning techniques comprise: synonym substitution, sentence restructuring, paraphrasing, summarization, and contextual rephrasing.

3. The computer-implemented method of claim 1, further comprising:
generating the heuristic to efficiently categorize and organize the prompt variations, wherein the categorized and organized prompt variations are displayed to the user, in an efficient manner, for review, and the heuristic is identified to align with user features.

4. The computer-implemented method of claim 1, further comprising:
Recording and retrieving user iteration feedback to and from a central database.

5. The computer-implemented method of claim 1, wherein the user interaction data comprises: navigation data, iteration intent, previous interaction data, preference data, and task type data.

6. The computer-implemented method of claim 1, further comprising:
monitoring keystrokes and cursor movement to identify the user interaction; and
utilizing the user interaction to update and output the variations of the prompt.

7. The computer-implemented method of claim 1, further comprising:
generating and outputting a text suggestion in an input window of the GUI, wherein the text suggestion is an autofill text, wherein the autofill text is generated in relation to a selected category and a section of one or more prompt rephrasing alternatives.

8. A computer system comprising:
one or more computer processors;
one or more computer readable storage devices;
program instructions stored on the one or more computer readable storage devices for execution by at least one of the one or more computer processors, the stored program instructions comprising:
program instructions to output prompts based on an initial input;
program instructions to generate variations of the prompts associated with the initial input by automatically leveraging machine learning techniques, wherein automatically leveraging machine learning techniques comprises reducing a length of text of the initial input by extracting one or more key points and condensing the text of the initial input into a shorter form;
program instructions to collect the prompts from a user resulting from an interaction with an artificial intelligent (AI) system;
program instructions to define a heuristic based on a use case of the user, interaction data, and the initial input to organize suggestions and the variations of the prompts;
program instructions to determine and utilize the heuristic to organize the variations of the prompts in systematic categories to produce an efficient display of the variations of the prompts, in a graphic user interface (GUI), for the user to view, wherein the heuristic mirrors a determined style preference of the user, and wherein the user interaction date is utilized to prioritize output options, and wherein the user interaction data comprises user interactions with the GUI associated with the initial input and the variations of the prompts;
program instructions to update the variations of the prompts based on identified interaction data from the user; and
program instructions to dynamically output the updated variations of the prompts in response to the identified and one or more collected user data.

9. The computer system of claim 8, wherein the machine learning techniques comprise: synonym substitution, sentence restructuring, paraphrasing, summarization, and contextual rephrasing.

10. The computer system of claim 8, further comprising:
program instructions to generate the heuristic to efficiently categorize and organize the prompt variations, wherein the categorized and organized prompt variations are displayed to the user, in an efficient manner, for review, and the heuristic is identified to align with user features.

11. The computer system of claim 8, further comprising:
program instructions to record and retrieve user iteration feedback to and from a central database.

12. The computer system of claim 8, wherein the user interaction data comprises:
navigation data, iteration intent, previous interaction data, preference data, and task type data.

13. The computer system of claim 8, further comprising:
program instructions to monitor keystrokes and cursor movement to identify the user interaction; and
utilize the user interaction to update and output the variations of the prompt.

14. The computer system of claim 8, further comprising:
program instructions to generate and output a text suggestion in an input window of the GUI, wherein the text suggestion is an autofill text, wherein the autofill text is generated in relation to a selected category and a section of one or more prompt rephrasing alternatives.

15. A computer program product comprising:
one or more computer readable storage devices and program instructions stored on the one or more computer readable storage devices, the stored program instructions comprising:
program instructions to output prompts based on an initial input;
program instructions to generate variations of the prompts associated with the initial input by automatically leveraging machine learning techniques, wherein automatically leveraging machine learning techniques comprises reducing a length of text of the initial input by extracting one or more key points and condensing the text of the initial input into a shorter form;

program instructions to collect the prompts from a user resulting from an interaction with an artificial intelligent (AI) system;

program instructions to define a heuristic based on a use case of the user, interaction data, and the initial input to organize suggestions and the variations of the prompts;

program instructions to determine and utilize the heuristic to organize the variations of the prompts in systematic categories to produce an efficient display of the variations of the prompts, in a graphic user interface (GUI), for the user to view, wherein the heuristic mirrors a determined style preference of the user, and wherein the user interaction date is utilized to prioritize output options, and wherein the user interaction data comprises user interactions with the GUI associated with the initial input and the variations of the prompts;

program instructions to update the variations of the prompts based on identified interaction data from the user; and program instructions to dynamically output the updated variations of the prompts in response to the identified and one or more collected user data.

16. The computer program product of claim 15, wherein the machine learning techniques comprise: synonym substitution, sentence restructuring, paraphrasing, summarization, and contextual rephrasing.

17. The computer program product of claim 15, further comprising:

program instructions to generate the heuristic to efficiently categorize and organize the prompt variations, wherein the categorized and organized prompt variations are displayed to the user, in an efficient manner, for review, and the heuristic is identified to align with user features.

18. The computer program product of claim 15, further comprising:

program instructions to record and retrieve user iteration feedback to and from a central database.

19. The computer program product of claim 15, wherein the user interaction data comprises: navigation data, iteration intent, previous interaction data, preference data, and task type data.

20. The computer program product of claim 15, further comprising:

program instructions to monitor keystrokes and cursor movement to identify the user interaction;

utilize the user interaction to update and output the variations of the prompt; and program instructions to generate and output a text suggestion in an input window of the GUI, wherein the text suggestion is an autofill text, wherein the autofill text is generated in relation to a selected category and a section of one or more prompt rephrasing alternatives.

* * * * *